April 3, 1934.   H. A. DOUGLAS   1,953,593
CIRCUIT CONTINUING DEVICE
Filed Nov. 11, 1931
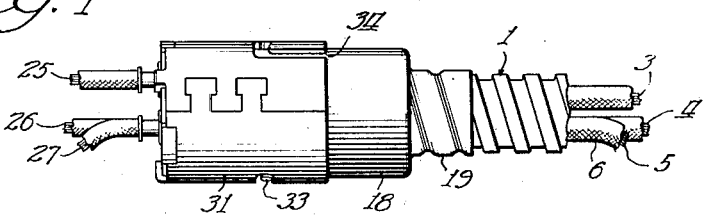
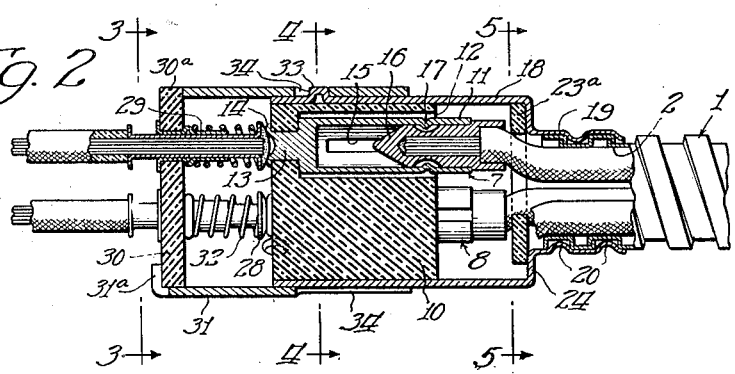
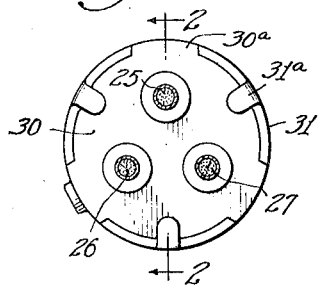 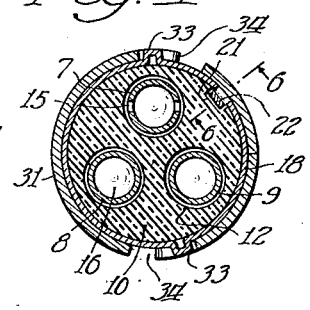 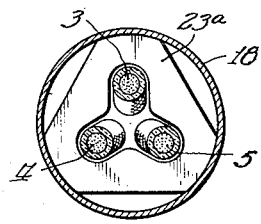
Inventor
Harry A. Douglas
By Langdon Moore
Atty.

UNITED STATES PATENT OFFICE 1,953,593

CIRCUIT CONTINUING DEVICE

Harry A. Douglas, Bronson, Mich.

Application November 11, 1931, Serial No. 574,271

1 Claim. (Cl. 173—328)

This invention relates to circuit continuing devices more particularly such as include wire enclosing metallic conduits.

Among other objects, my invention aims to provide improved means whereby the conventional flexible metallic conduit may be readily coupled with contact enclosing shells.

The invention is also desirably inclusive of means for coupling the shells together and to the conduit so as to place conductors carried by the shells and conduit in register, to continue electric circuits through predetermined conductors.

The invention may be understood by reference to the illustrative embodiment thereof shown in the accompanying drawing, in which—

Figure 1 is an elevational view of a circuit continuing device embodying my invention;

Figure 2 is an axial section thereof somewhat enlarged, taken on the line 2—2 of Figure 3;

Figure 3 is a cross section taken on the line 3—3 of Figure 2;

Figure 4 is a cross section taken on the line 4—4 of Figure 2;

Figure 5 is a cross section taken on the line 5—5 of Figure 2; and

Figure 6 is a fragmentary longitudinal section taken on the line 6—6 of Figure 4.

Referring in detail to the figures of the drawing, I have shown a wire enclosing conduit such as the flexible metallic conduit 1 which may be made of intermeshing helically wound members forming the external ribs 2, of well-known construction, throughout its length. The conduit 1 provides in the usual manner an armor for a current conductor, in this instance, the three current conductors represented by the insulated wires 3, 4 and 5 each having the insulation 6 thereon. A metallic contact member is provided for each of the wires 3, 4 and 5, such as the contacts 7, 8 and 9. These contacts are carried by the cylindrical insulating block 10. In this instance, the contacts 7, 8 and 9 extend through the block 10, having a sleeve portion 11 which lies in a longitudinal recess 12 in the insulating block 10, the recess 12 being of slightly larger diameter than the sleeve 11 for a purpose presently pointed out. The contacts each have a solid reduced portion 13 which continues through the end wall of the recess 12 to terminate in a cup-shaped portion 14, which has its edge spun over the adjacent face of the insulating block 10. The sleeve 11 is advantageously split, as at 15, to provide a spring jack which receives the metallic bulbous shaped plug 16 soldered to the ends of each of the wires 3, 4 and 5, the sleeves 11 having an annular internal shoulder 17 which snaps over the bulbous tip of the plug. Thus the wires 3, 4 and 5 may be firmly connected with the contact members 7, 8 and 9, respectively.

So constructed and arranged the contact members 7, 8 and 9 are spaced from the end of the conduit 1 a predetermined distance such that the conduit provides an armor for the insulated wires 3, 4 and 5 substantially throughout their length. To maintain this predetermined spacing, I provide a coupler here represented by a cylindrical metallic shell 18, which is adapted to engage the conduit and to snugly surround the insulating block 10. The shell 18, in accordance with this embodiment of my invention, has a reduced tubular tail portion 19 in which is produced the internal threads 20 which mate with the helical ribs 2 on the conduit 1 to effect a screw connection between the conduit and the shell.

To assemble the parts, the shell 18 may be passed over the plugs 16, and, before these are connected with the contacts, may be screwed onto the conduit 1 sufficiently far back of the plugs to permit the plugs to be readily inserted in their respective sleeves 11 of the contacts 7, 8 and 9. The shell 18 may then be screwed back over the insulating block 10 until the open end of the shell is flush with the end of the insulating block through which the contacts 7, 8 and 9 protrude, the tail of the shell still engaging the conduit. With the parts thus assembled, I provide interengaging means between the shell and insulating block for locking the shell and block against further relative rotative movement. Such means is represented in the illustrative construction by the groove 21 (see Figs. 4 and 6) which receives a lug 22 conveniently punched out of the shell and depressible to engage in this groove. To further fix the relative positions of the shell and block a stop 23 may be located in the forward end of the groove 21 against which the lug 22 abuts to prevent movement of the shell 18 beyond the outer end of the block.

To insulate the plugs 16 from the inner end of the shell 18 a fiber plate 23$^a$, for example, may be interposed therebetween, the wires 3, 4 and 5. In one instance, the wires may be passed through the fiber plate before their ends are secured to the plugs 11, the fiber plate being maintained in position by abutment with the plugs 11 and the shoulder portion 24 of the shell 18. The plate 23$^a$ also serves to insure that the plugs 16 are insulated from each other.

To continue the electric circuits which include the conductors 3, 4 and 5 through other predetermined conductors represented by the insulated wires 25, 26 and 27, I provide that the contacts 7, 8 and 9 connected respectively with the wires 3, 4 and 5 shall be complementary each to a terminal contact 28 in which each of the wires 25, 26 and 27 terminates. In the illustrative construction, the contacts 28 comprise double-headed hollow shanks in which the bared end of the wires 25, 26 and 27 are respectively soldered, the shanks being passed through tubular guides 29 riveted through an insulating disc 30 which is appropriately mounted in a second shell such as the socket 31. The disc may be secured by having portions 31ᵃ of the socket clinched over the disc and the disc having lateral extensions 30ᵃ which extend into notches in the periphery of the socket. The contacts 28 extend into the socket and are pressed thereinto by the coil springs 32.

To make electrical connection between the conductors 3, 4 and 5 and the conductors 25, 26 and 27, respectively, the socket 31 is adapted to receive the shell 18 and the parts are provided with interengaging means, whereby their relative rotative position is predetermined. In this instance, the shell carries on its outer surface the bayonet pins 33 which engage bayonet slots 34 in the body of the socket and the bayonet pins in the shell and the bayonet slots (Fig. 4) in the socket are offset from a diametric line passing through the socket and shell, so that the shell can be inserted in the socket in only one way and when inserted can occupy but one rotative position with respect to the socket, whereby the contacts 7, 8 and 9 carried by the shell will be complementary each to one of the contacts 28 of the socket which will place the wire 3 in electrical connection with the wire 25, the wire 4 in electrical connection with the wire 26 and the wire 5 in electrical connection with the wire 27.

The contacts 28 are maintained in abutment with the contacts 7, 8 and 9 by the springs 32 which also press the bayonet pins 33 into their bayonet seats to determine the relative longitudinal position of the shell and socket.

Thus I have provided two contact enclosing shells with means for coupling the shells together and to a wire enclosing conduit, so as to place conductors carried by the shells and the conduit in register to continue electric circuits through predetermined conductors.

Obviously, the invention is not limited to details of construction shown herein for purposes of exemplification. Furthermore, it is not indispensable that all features of the invention be used conjointly as various combinations and sub-combinations may be advantageously employed.

Having described one embodiment of my invention, I claim:

The combination with a helically wound flexible metallic conduit, of a current conductor passing through said conduit, a contact for one end of the said conductor spaced from the conduit, a plug and sleeve snap connection between the conductor and contact comprising a terminal plug on the conductor and a split sleeve extension on the contact receiving said plug, an insulating block carrying said contact, a longitudinal recess in the insulating block, said sleeve extension passing through said recess in spaced apart relation thereto, a cylindrical metallic shell having a body portion and a tail portion, said tail portion being formed to provide internal threads screwing on the conduit and the body portion being slidable and rotatable to surround the insulating block and to bring said tail portion closely adjacent said plug, and compressed means locking the insulating block and shell against rotation, whereby the block, shell and conduit are maintained in engagement.

HARRY A. DOUGLAS.